United States Patent [19]
Reynolds

[11] B 4,008,608
[45] Feb. 22, 1977

[54] METHOD OF PREDICTING GEOTHERMAL GRADIENTS IN WELLS

[75] Inventor: Edward B. Reynolds, Spring, Tex.

[73] Assignee: Continental Oil Company, Ponca City, Okla.

[22] Filed: Oct. 10, 1974

[21] Appl. No.: 513,791

[44] Published under the second Trial Voluntary Protest Program on March 30, 1976 as document No. B 513,791.

[52] U.S. Cl. ................................................. 73/154
[51] Int. Cl.$^2$ ...................................... E21B 47/06
[58] Field of Search ............ 73/154, 152; 181/102, 181/105

[56] References Cited
UNITED STATES PATENTS

| 3,618,001 | 11/1971 | Zill | 73/152 X |
|---|---|---|---|
| 3,805,587 | 4/1974 | Sayer | 73/154 X |

*Primary Examiner*—Jerry W. Myracle
*Attorney, Agent, or Firm*—Richard W. Collins

[57] ABSTRACT

Method of predicting geothermal gradients of subterranean strata comprising relating trends or changes in the velocity of waves propagated through the strata with similar trends or changes in strata whose geothermal gradient is known.

10 Claims, 3 Drawing Figures

METHOD OF PREDICTING GEOTHERMAL GRADIENTS IN WELLS

BACKGROUND OF THE INVENTION a. Field of the Invention

This invention relates to a method for determining the geothermal gradient of subterranean formations. More particularly, the invention relates to such a method useful in drilling wells through such subterranean formations.

b. Description of the Prior Art

In the drilling of wells, the temperature or geothermal gradient of the subterranean formations being drilled are important considerations. Different drilling apparatus, procedures, and fluids are required for drilling formations of different temperatures. Generally, the temperature increases in some manner with increasing depth, but the rate of change varies. It would be particularly desirable to have a method for predicting the temperature of formations before drilling into them. A knowledge of the temperature of underlying formations can give an indication to those skilled in the art of the depth at which desirable hydrocarbons are most likely to be encountered. Heretofore, determining the geothermal gradient of a formation prior to drilling into it has not been done. During the drilling operation, the bottom hole temperature can be directly measured by stopping drilling and lowering a thermometer into the hole. From the temperature and depth information, the geothermal gradient may be calculated. However, such methods are time consuming and tend to be inaccurate due to the cooling effect on the wellbore of the drilling fluid being circulated unless the drilling operations are shut in for a thermal equilibrium with the surrounding formation. Shutting in a well during drilling is highly undesirable because it unduly lengthens the expensive drilling operation.

It is an object of this invention to provide a method for determining the geothermal gradient of a subterranean formation.

It is another object to provide such a method which can be used to predict such geothermal gradient below a borehole being drilled into the subterranean formation.

It is still another object to provide such a method which can be used to predict such geothermal gradient without drilling into the subterranean formation.

It is a further object to provide an indirect method of predicting the geothermal gradient of a subterranean formation during drilling of a well, which method is unaffected by the actual temperature of the borehole. Other objects, advantages, and features will become apparent from the following description, drawings, and appended claims.

BRIEF SUMMARY OF THE INVENTION

A method of predicting the geothermal gradient of a subterranean formation comprising establishing velocity trends in the formation and comparing the velocity trends with the velocity trends of formations whose geothermal gradient has previously been determined. The velocity trends can be established by acoustic logging, check shot velocity surveys, or seismic velocity analysis.

DESCRIPTION OF PREFERRED EMBODIMENT

Figure 1:
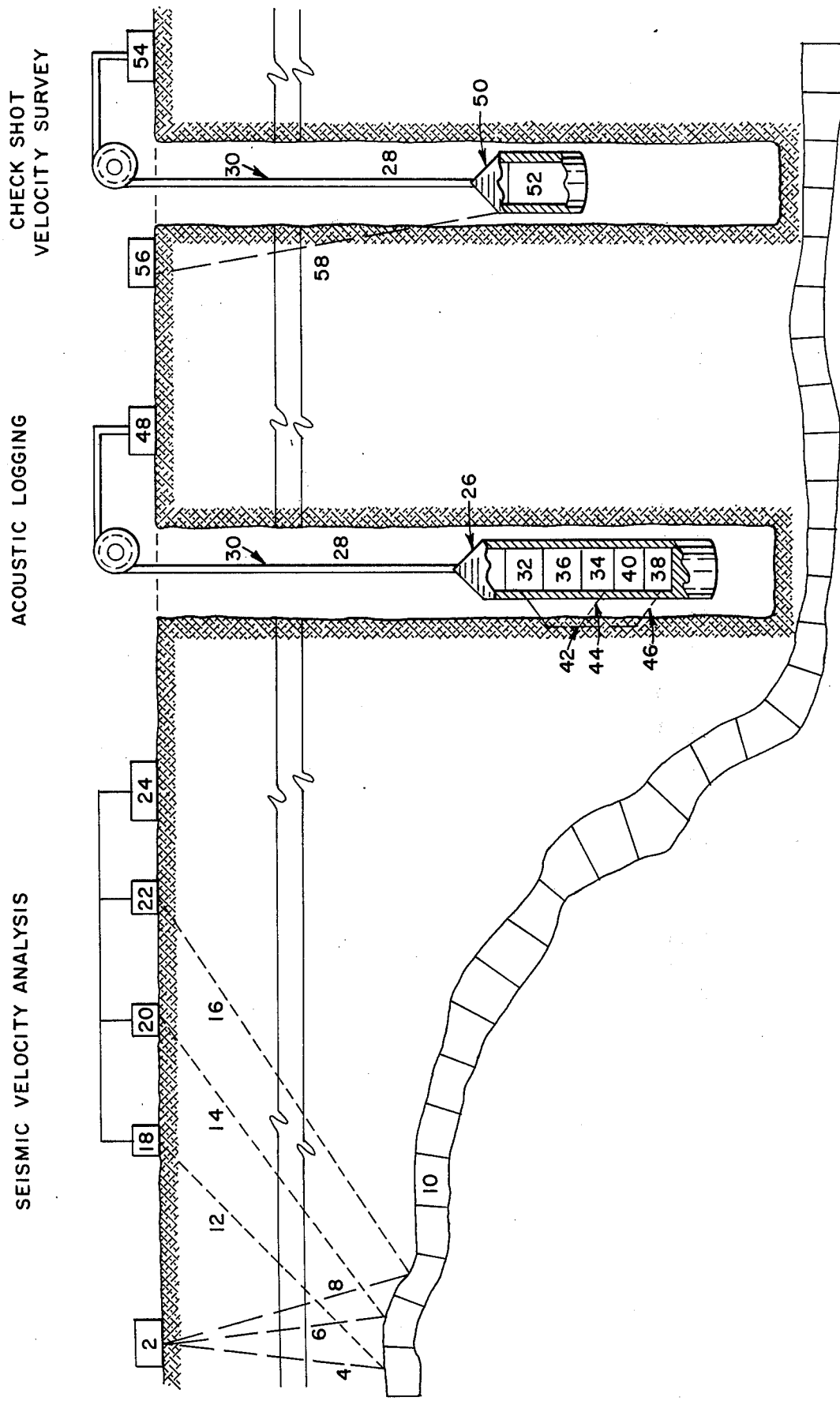
FIG. 1 is a schematic representation partially in section of three systems for obtaining the velocity profile useful in the practice of the instant invention showing a vertical section of the earth and the generation, reflection, and refraction of waves therethrough.

The geothermal gradient is defined as the variation in temperature of the subsurface strata with distance below the earth's surface. Velocity is the speed of travel of various waves, such as shock waves or sound waves, propagated through the formation. It was found that a relationship exists between the trends or changes in velocity with depth and the geothermal gradient. Thus, it is possible to predict geothermal gradients from conventional well log data, such as acoustic transit time logs and check shot velocity surveys, or from seismic data, such as seismic velocity analysis. Referring now to FIG. 1, velocity trends can be established by acoustic logging, check shot velocity surveys, or seismic velocity analysis. Seismic waves are generated at the surface at point 2, as by dropping a weight, vibrating the surface of the earth as with a hydraulic ram or detonating an explosive. The seismic waves travel downwardly through the earth in all directions. For purposes of illustration, three particular waves 4, 6, and 8 are shown. When waves 4, 6, and 8 strike subsurface formation 10, a portion of the wave energy is reflected from strata 10 along lines 12, 14, and 16 to geophones or seismometers 18, 20, and 22 positioned along the earth's surface at suitable predetermined locations. Geophones or seismometers 18, 20, and 22 are connected by conventional means to recording means 24 where a signal trace is recorded of the strength of the signal and the time of its transmission. Thus by knowing these times for known offset distances, velocities can be computed.

Alternatively, a signal trace can be obtained by acoustic logging wherein an acoustic logging tool, typically an elongated cylinder shown generally by numeral 26, is lowered through borehole 28 via wireline and armored conductor cable 30. Acoustic logging tool 26 is comprised of transmitting transducer 32, first receiving transducer 34, acoustic insulator 36 separating transmitting transducer 32 and first receiving transducer 34, second receiving transducer 38 and acoustic insulator 40 separating first receiving transducer 34 and second receiving transducer 38. Acoustic waves or pulses are periodically generated by transmitting transducer 32 and travel outwardly through the earth in all directions. Since these waves travel at different speeds in the rock and fluid media, receiving transducers 34 and 38 record the wave which has followed the fastest path. This path is shown in FIG. 1 as path 42, that is the wave travels from transmitting transducer 32 through the borehole fluid, along the rock-borehole interface, and then portions of borehole wave travel back through the borehold fluid to each of the two receiving transducers 34 and 38 as shown by ray paths 44 and 46. The signals received by first receiving transducer 34 and second receiving transducer 38 are transmitted up borehole 28 via conductor cable 30 to recording equipment 48 at the surface. By noting the difference in arrival times at the two receiving transducers and the distance separating the two receiving transducers, the velocity of the formation can be determined on a continuous basis from the top to the bottom of the well.

The third technique commonly used to determine formation velocities is the check shot velocity survey which is schematically shown in FIG. 1. Similarly as is done in acoustic logging, elongated cylinder 50 is lowered into borehole 28 via wireline and armored conductor cable 30. However, logging tool 50 is comprised of only receiving transducer 52 and the necessary electronics for transmission back to surface recorder 54. Seismic waves are generated at the surface at source point 56 using one of the sources described under seismic velocity analysis. The seismic waves travel downwardly through the earth in all directions. For the purpose of illustration, one particular wave travels wave path 58 to receiving transducer 52. By noting the arrival time at receiving transducer 52 and the distance between source 56 and receiving transducer 52, the velocity may be computed.

It is to be understood that FIG. 1 represents three entirely different and separate methods of obtaining velocity trends useful in the method of the instant invention.

Figure 2:
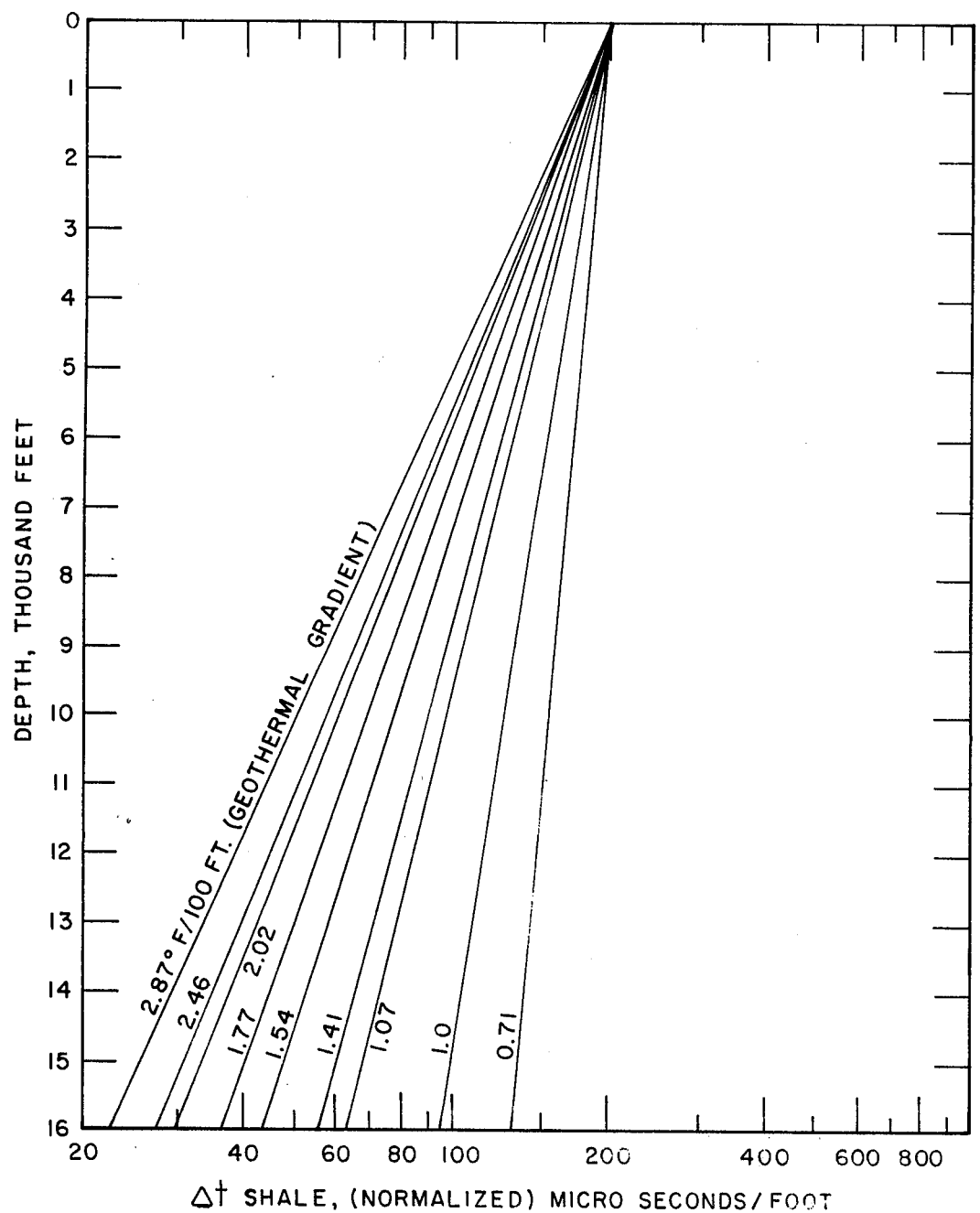
FIG. 2 is a graph.

The velocity behavior through the various strata through which wells were drilled or were to be drilled was determined. FIG. 2 shows a plot of shale transit time from an acoustical log versus depth for nine different wells drilled in widely scattered locations throughout the world. A maximum recording thermometer was run along with the logging tool to determine the bottom hole temperature of each well. The temperature gradient was then calculated in terms of degrees Fahrenheit per 100 feet of depth from the knowledge of the bottom hole temperature and the depth of the well. The temperature gradient is shown for each well. The acoustic velocity measuring tool comprised a transmitter, such as a magnetostrictive transducer, and spaced receivers, the receivers respectively detecting the arrival of an acoustic impulse, pulse or wave emitted from the transmitter. The time interval, $\Delta t$, between arrivals at the receivers was recorded versus depth as a value on the recorder chart as the tool is moved along the length of the borehole. The $\Delta t$ signal corresponds to the sonic energy travel time through a fixed distance between the two receivers, the signal is a measure, at least in part, of some of the characteristics of the formation, such as the speed of sound therein and formation porosity.

In order to compare the curves more easily, the $\Delta t$ values were normalized; i.e., shifted so that the 0 depth intercept of each was 200 micro seconds per foot ($\mu$ seconds per foot). This operation did not change the slope of the curves. It will be noted from FIG. 2 that the steeper trends are associated with relatively low geothermal gradients and the more gentle trends are associated with relatively high geothermal gradients. Clastic sections that have high geothermal gradients also have higher velocities than the sediments with moderate to low geothermal gradients.

Figure 3:
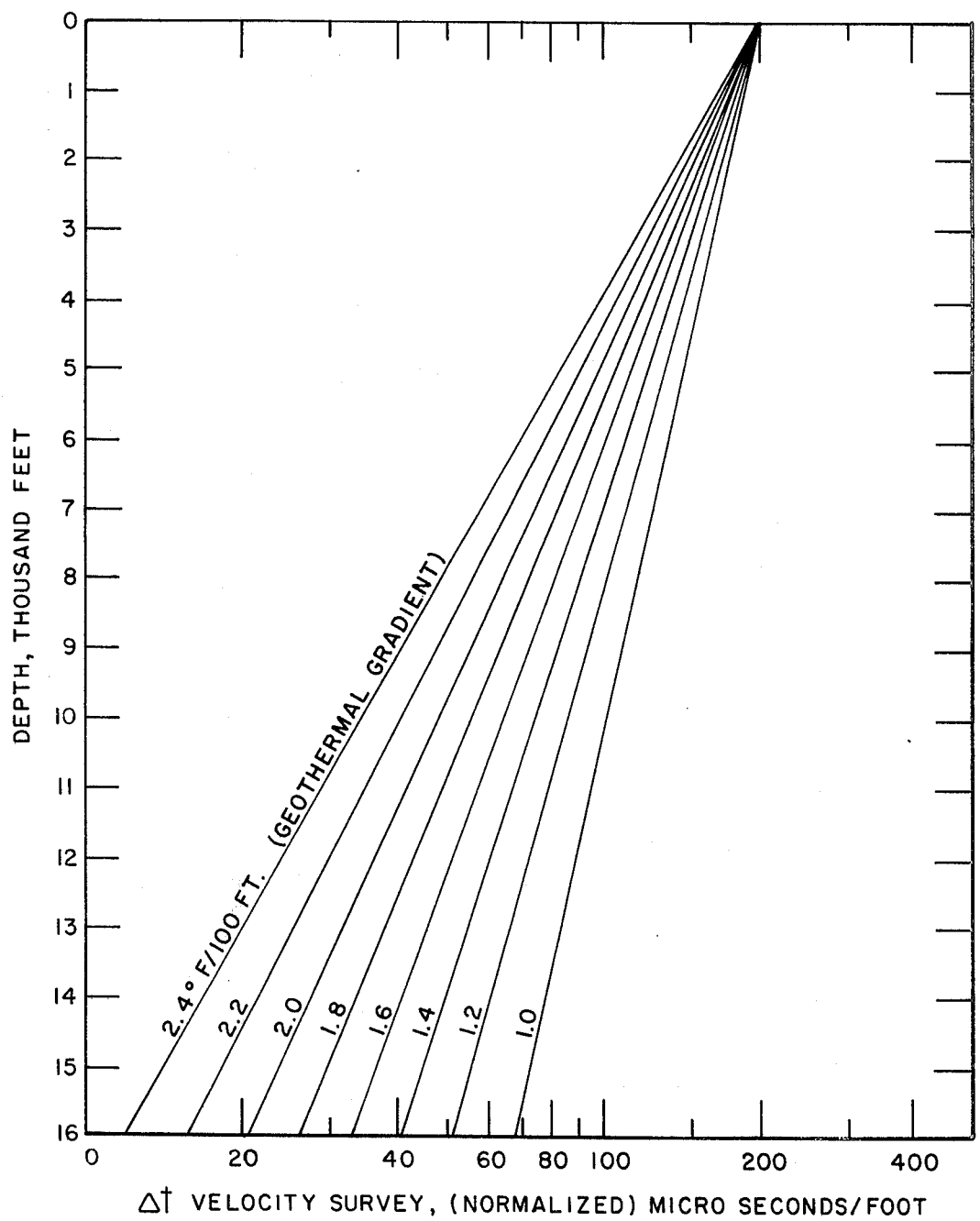
FIG. 3 is a graph.

FIG. 3 shows a similar plot of check shot velocity survey transit times versus depth for eight different locations widely scattered throughout the world. After the seismic velocity analyses were made, wells were drilled and the bottom hole temperature determined by lowering a maximum-recording thermometer down the borehole. The temperature gradient was calculated as described above. The time interval, $\Delta t$, for the velocity survey was plotted versus depth on semi-logarithmic paper. As above, the $\Delta t$ values were normalized so that the 0 depth intercept of each was 200 micro seconds per foot ($\mu$ seconds per foot). The geothermal gradient is listed for each velocity survey. It will be noted that the steeper trends are associated with relatively low geothermal gradients and the more gentle trends are associated with relatively high gradients. Since check shot velocity surveys and seismic velocity analyses theoretically yield the same velocity information, the relationship in FIG. 3 can be used for both techniques.

In order to carry out the process of the instant invention, a velocity analysis is obtained of the subterranean strata in an area of interest. If no well has as yet been drilled through the strata, this is done by carrying out a seismic velocity analysis from the surface. If a well has been drilled or is being drilled, the velocity profile can be obtained either by carrying out a seismic velocity analysis from the surface, by running an acoustic log in the well, or running a check shot velocity survey. The results of the velocity profile are then plotted versus depth on semi-logarithmic paper. Using the family of curves from FIGS. 2 or 3, the slope of the curve of the plot of velocity versus depth is compared to the slope of the nearest similar curve in the appropriate figure. The geothermal gradient is then read from the nearest similar curve.

I claim:

1. A method of predicting the geothermal gradient of subterranean strata by determining velocity trends in the strata and comparing same with the velocity trends of formations for which geothermal gradients have previously been determined and plotted on semi-logarithmic paper as a family of curves of velocity trends versus geothermal gradients comprising:
   a. determining the velocity trend at various depths of a wave propagated through the subterranean strata,
   b. plotting the velocity trend versus depth on semi-logarithmic paper to generate a curve, and
   c. comparing the curve obtained with a family of similar curves of known geothermal gradients.

2. The method of claim 1 wherein the velocity trend is a check shot velocity survey trend.

3. The method of claim 1 wherein the velocity trend is an acoustic log trend.

4. The method of claim 1 wherein the velocity trend is a seismic velocity trend.

5. The method of claim 1 wherein the velocity trend is established from the surface of the earth.

6. The method of claim 1 wherein the velocity trend is established from a borehole drilled at least partially through the subterranean strata.

7. The method of claim 1 wherein the wave propagated through the subterranean strata is a sound wave or a shock wave.

8. A method of predicting the geothermal gradient of subterranean strata from the surface of the earth by determining velocity trends in the strata and comparing same with the velocity trends of formations for which geothermal gradients have previously been determined and plotted on semi-logarithmic paper as a family of curves of velocity trends versus geothermal gradients comprising:
   a. running a seismic velocity analysis on the subterranean strata,
   b. plotting the results of the seismic velocity analysis versus depth on semi-logarithmic paper, and c. comparing the plot obtained with similar plots of known geothermal gradient.

9. A method of predicting the geothermal gradient of subterranean strata from a borehole by determining velocity trends in the strata and comparing same with the velocity trends of formations for which geothermal gradients have previously been determined and plotted on semi-logarithmic paper as a family of curves of velocity trends versus geothermal gradients comprising:
 a. running an acoustic log in the borehole,
 b. plotting the results of the acoustic log versus depth on semi-logarithmic paper, and
 c. comparing the plot obtained with similar plots of known geothermal gradient.

10. A method of predicting the geothermal gradient of subterranean strata from a borehole by determining velocity trends in the strata and comparing same with the velocity trends of formations for which geothermal gradients have previously been determined and plotted on semi-logarithmic paper as a family of curves of velocity trends versus geothermal gradients comprising:
 a. running a check shot velocity survey in the borehole,
 b. plotting the results of the velocity survey versus depth on semi-logarithmic paper, and
 c. comparing the plot obtained with similar plots of known geothermal gradient.

* * * * *